US012484164B2

(12) United States Patent
Gordon

(10) Patent No.: US 12,484,164 B2
(45) Date of Patent: Nov. 25, 2025

(54) MAGNETIC LOCKING MECHANISM FOR A POLYGONAL COMPUTING DEVICE

(71) Applicant: Microsoft Technology Licensing, LLC, Redmond, WA (US)

(72) Inventor: Michael Cameron Gordon, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 163 days.

(21) Appl. No.: 18/394,587

(22) Filed: Dec. 22, 2023

(65) Prior Publication Data
US 2025/0212343 A1 Jun. 26, 2025

(51) Int. Cl.
G06F 1/16 (2006.01)
E05B 47/00 (2006.01)
H05K 5/00 (2025.01)
H05K 5/02 (2006.01)
H05K 7/00 (2006.01)

(52) U.S. Cl.
CPC ....... *H05K 5/0208* (2013.01); *E05B 47/0045* (2013.01); *H05K 5/0221* (2013.01)

(58) Field of Classification Search
CPC .. H05K 5/0208; H05K 5/0221; H05K 5/0209; H05K 5/0211; H05K 5/0217; H05K 5/0226; H05K 5/023; E05B 47/0045; E05B 47/0038; E05B 47/0044; E05B 47/0043
See application file for complete search history.

(56) References Cited

U.S. PATENT DOCUMENTS 3,967,480 A 7/1976 Stackhouse
4,489,842 A 12/1984 Bobrove
5,996,831 A * 12/1999 Teok ............... E05B 47/004
220/345.2
(Continued)

FOREIGN PATENT DOCUMENTS

CN 101398904 A 4/2009
CN 103118153 A 5/2013
(Continued)

OTHER PUBLICATIONS

"Tot Lok—the Original Magnet lock", Retrieved from: https://protectenfant.com/shop/totlok-magnet-loquet, Retrieved Date: Apr. 27, 2023, 8 Pages.

*Primary Examiner* — Anthony M Haughton
(74) *Attorney, Agent, or Firm* — Holzer Patel Drennan

(57) ABSTRACT

The presently disclosed magnetic locking mechanism(s) for a rectangular computing device is directed at providing a fast, but tamper resistant, and anti-theft solution for assembly and disassembly of a rectangular computing device having a top and a base that come together to form an overall enclosure for the rectangular computing device. The top and base that incorporate one or more of the presently disclosed magnetic locking mechanisms are capable of being quickly and easily attached and detached without damaging the rectangular computing device, so long as a correct magnetic key is used. This aids both repairability and upgradability of the rectangular computing device during its life cycle, as well as recyclability at the end of its life cycle. Without the correct magnetic key, it is difficult to separate the top and base without damaging the rectangular computing device.

20 Claims, 8 Drawing Sheets

(56) References Cited

U.S. PATENT DOCUMENTS

| | | | |
|---|---|---|---|
| 9,273,494 B2* | 3/2016 | Fontana | E05B 47/0038 |
| 2007/0026297 A1 | 2/2007 | Qin et al. | |
| 2008/0194120 A1 | 8/2008 | Vatanparast et al. | |
| 2009/0161303 A1 | 6/2009 | Hirota | |
| 2010/0050710 A1 | 3/2010 | Lax et al. | |
| 2010/0172108 A1 | 7/2010 | Yang | |
| 2014/0202221 A1 | 7/2014 | Fontana et al. | |
| 2015/0092333 A1 | 4/2015 | Kim | |
| 2016/0102805 A1* | 4/2016 | Khodapanah | F16M 13/022 248/224.8 |
| 2019/0148874 A1* | 5/2019 | Sorrentino | H01R 13/5213 439/136 |
| 2021/0046885 A1* | 2/2021 | Jankura | F16B 2/04 |
| 2024/0419219 A1* | 12/2024 | Tomky | H01F 7/081 |
| 2025/0059799 A1* | 2/2025 | Gordon | G06F 1/1679 |

FOREIGN PATENT DOCUMENTS

| | | |
|---|---|---|
| CN | 106529355 A | 3/2017 |
| CN | 111931894 A | 11/2020 |

* cited by examiner

MAGNETIC LOCKING MECHANISM FOR A POLYGONAL COMPUTING DEVICE

BACKGROUND

It is increasingly important to build low cost and sustainable computing devices that deliver a high degree of cosmetic performance. Many existing computing devices rely on screwed or snapped connections for final assembly, such as placing a cover on a device body of the computing device.

SUMMARY

Implementations described and claimed herein provide a computing device comprising a base, a top, and computing hardware. The base includes a polygonal exterior perimeter and a set of spring-loaded magnetic pins in a spaced arrangement about the exterior perimeter of the base, the spring-loaded magnetic pins biased to extend outward from the base. The top includes a polygonal interior perimeter to fit over the base, the polygonal interior perimeter of the top to surround the polygonal exterior perimeter of the base. The top further includes a set of pin seats in a spaced arrangement about the interior perimeter of the top, each of the pin seats corresponding to one of the spring-loaded magnetic pins. The pin seats selectively receive the spring-loaded magnetic pins to prevent the top from lifting linearly away from the base. The computing hardware is mounted within an interior recess in one or both of the base and the top.

Other implementations are also described and recited herein. This Summary is provided to introduce a selection of concepts in a simplified form that are further described below in the Detailed Descriptions. This Summary is not intended to identify key features or essential features of the claimed subject matter, nor is it intended to be used to limit the scope of the claimed subject matter.

DETAILED DESCRIPTION

Screwed connections are often time consuming to effect and yield exposed fasteners in the end product that may be unsightly and/or encourage tampering (e.g., removal by a non-authorized user). Snapped connections may be faster than screwed connections to effect, but can be difficult to undo without damaging the cover or the device body, even by an authorized user (e.g., to conduct authorized repairs). Further, snapped connections may be similarly unsightly and/or encourage tampering. Both screwed and snapped connections may provide an obvious access point, which can encourage unauthorized tampering and attempted disassembly.

The presently disclosed technology is directed at providing a fast, but tamper resistant solution for assembly and disassembly of a polygonal computing device having a base and a top that come together to form an enclosure for the computing device. The base and the top that incorporate one of the presently disclosed magnetic locking mechanisms are capable of being quickly and easily attached (e.g., during initial or repaired end product assembly) and detached (e.g., to conduct authorized repairs) without damaging the computing device, so long as a correct magnetic key(s) are used. This aids both repairability and upgradability of the computing device during its life cycle, as well as recyclability at the end of its life cycle. Without the correct magnetic key(s), it is difficult to separate the base and the top without damaging the computing device. Further, the presently disclosed magnetic locking mechanisms are fully hidden from view in the assembled end product, thereby discouraging tampering (e.g., removal by a non-authorized user).

Some existing devices incorporate an over-molded or adhered finishing cover to conceal unsightly snapped or screwed connections. However, this additional component adds expense and may reduce the recyclability of an end product by making the top and base more difficult to separate from one another. By making the presently disclosed magnetic locking mechanisms fully hidden from view in the assembled end product, an over-molded or adhered finishing cover is unnecessary and can be omitted. This avoids the additional expense of a finishing cover, as well as the reduced recyclability of an end product that incorporates a finishing cover. Further, existing snapped connections often suffer from rattling due to assembly tolerances that may change or even grow over time, particularly as the computing device is handled roughly. Specifically, screwed connections may become inadvertently loosened and/or materials used in device body, cover and/or snap connection therebetween may shrink and/or become more brittle over time. The presently disclosed magnetic locking mechanisms may adopt magnetic anti-rattle features that prevent (or reduce) rattling by taking up any assembly tolerances.

Figure 1:
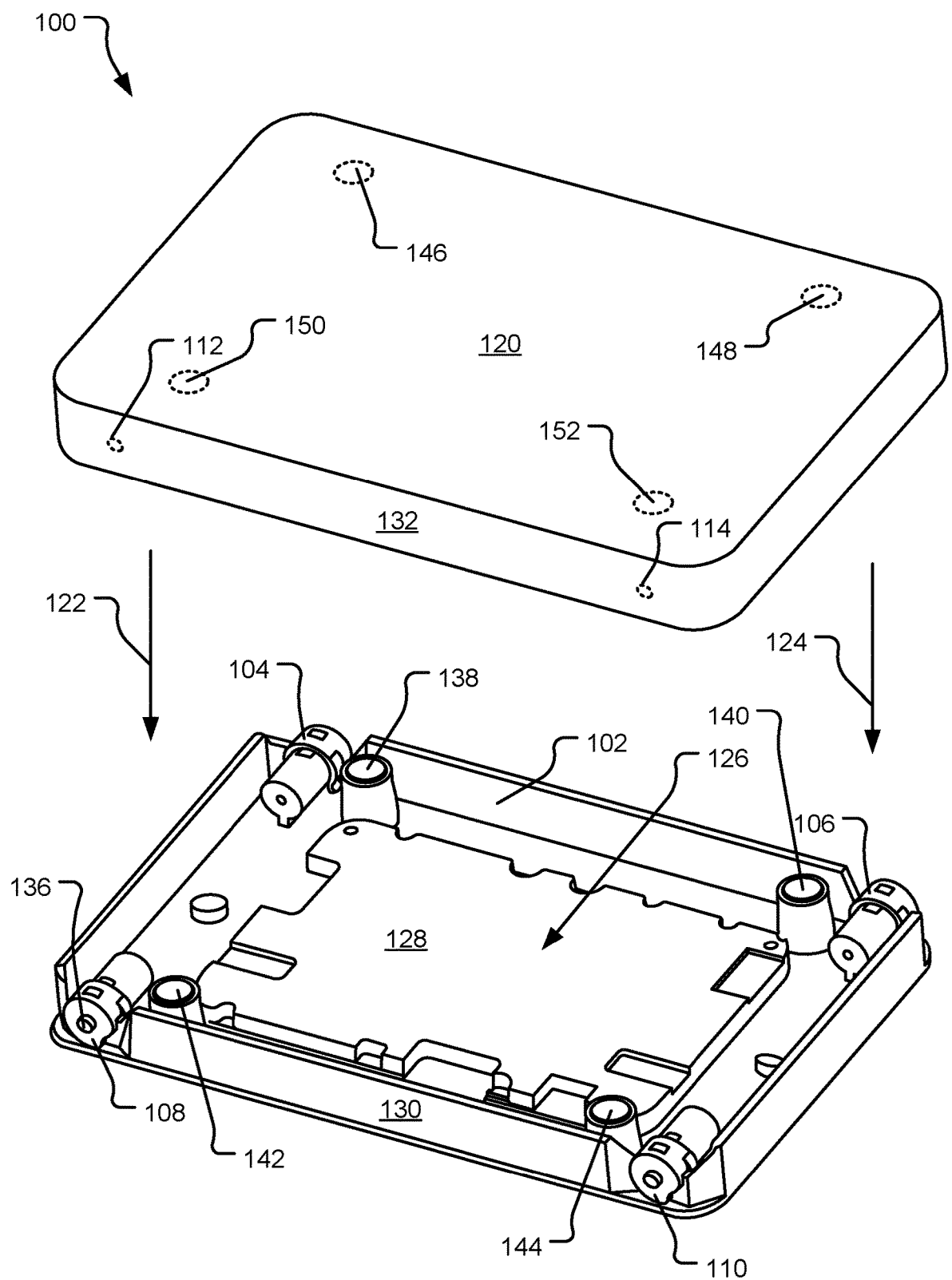
FIG. 1 illustrates an example base that adopts spring-loaded magnetic pins and an example top that adopts corresponding pin seats that together form a magnetic locking mechanism for a polygonal computing device.

FIG. 1 illustrates an example base 102 that adopts spring-loaded magnetic pins 104, 106, 108, 110 and an example top 120 that adopts corresponding pin seats (e.g., pin seats 112, 114) that together form a magnetic locking mechanism for a polygonal (specifically, rectangular) computing device 100. The base 102, when combined with the top 120, as illustrated by arrows 122, 124 serves as a housing that defines an enclosure for the computing device 100. A central cavity (or interior recess) 126 in the base 102 encloses a variety of internal components and computing hardware (e.g., printed circuit board (PCB) 128) that render the computing device functional as such. The base 102 is generally rectangular with an open top that is covered when the top is attached (or responsive at least to attachment of the top enclosure) to the base 102. The top 120 is selectively attached to the base 102 in order to secure the internal components within the central cavity 126 and seal the interior of the computing device 100 from external contamination. In various implementations, the base 102 and the top 120 may each be considered a plate or a partial enclosure for the computing device 100. Whether one or both of the base 102 and the top 120 form the enclosure, the resulting central cavity 126 is where computing hardware for the computing device 100 is mounted.

The resulting computing device is a sleek rectangular puck form factor. An example implementation may be 50-200 mm in width and length and 15-25 mm in height. Discontinuous side walls (e.g., side wall 130) of the base 102 define a rectangular exterior perimeter of the base 102. The side walls of the base 102 may overlap partially or entirely with a corresponding continuous side wall 132 that defines a rectangular interior perimeter of the generally rectangular top 120. The rectangular interior perimeter of the top 120 fits over the rectangular exterior perimeter of the base 102 where the rectangular interior perimeter of the top 120 surrounds the rectangular exterior perimeter of the base 102 with the overlap. The overlap may improve the seal between the base 102 and the top 120 and/or increase the resistance of the base 102 from being pried apart from the top 120 using brute force.

The computing device may be any sort of computing device (e.g., a tablet computer, laptop computer, personal computer, gaming device, smart phone, or any other discrete device that receives physical user inputs and carries out one or more sets of arithmetic and/or logical operations), an input device for a computing device (e.g., a handheld controller, keyboard, trackpad, or mouse), or a device that is not necessarily related to computing at all (e.g., vehicle components, consumer electronics (e.g., cameras, telephones, and home appliances), medical devices, and industrial or commercial machinery) that has internal components sealed by the base 102 in combination with the top 120 using one or more of the presently-disclosed magnetic locking mechanisms.

The spring-loaded magnetic pins 104, 106, 108, 110 are each used in conjunction with corresponding pin seats (e.g., pin seats 112, 114) to create the magnetic locking mechanism for a rectangular computing device 100. The spring-loaded magnetic pins are arranged in a spaced manner, as shown, to distribute the locking mechanism about the exterior perimeter of the base 102. The pins 104, 106, 108, 110 are designed so that protruding metal portions (e.g., metal portion 136 of pin 108) biased to extend outward from the base 102, e.g., via spring force (see e.g., FIGS. 4A and 4B, discussed below).

The pin seats are similarly arranged in a spaced manner, though only two pin seats 112, 114 are shown in FIG. 1, and they are rendered in broken lines as they are only visible from the non-depicted interior of the top 120. The pin seats are recesses in the interior perimeter of the top 120 sized, shaped, and located to receive the pins 104, 106, 108, 110 in a locked orientation of the computing device 100. Specifically, the pins 104, 106, 108, 110 protrude outwardly from the rectangular interior perimeter of the side walls of the base 102.

The pins 104, 106, 108, 110 are placed in FIG. 1 on opposing sides of the rectangular exterior perimeter of the base 102, generally in each of the four corners of the base 102. This effectively spreads locking forces across the length and width of the base 102. Other implementations may adopt one or more similar pins in all sides of the rectangular exterior perimeter of the base, either in the corners (as illustrated) or elsewhere on each side. The pin seats are similarly arranged on opposing sides (as shown) or all sides of the interior perimeter of the top 120.

Each pin protruding from the base 102 engages with one of the pin seats in the top 120 in the locked orientation (see e.g., the locked orientation depicted in FIG. 4A, discussed below). In the locked orientation of the top 120 with reference to the base 102, the pin seats that receive the spring-loaded magnetic pins prevent the top from lifting linearly away from the base. In an unlocked orientation of the top 120 with reference to the base 102, each pin is retracted from its respective pin seat (see e.g., the unlocked orientation depicted in FIG. 4A, discussed below). In the unlocked rotational orientation, the top 120 is free to be selectively lifted linearly away from the base 102 as mating surfaces and tolerances between the base 102 and the top 120 may only permit linear movement. The pins 104, 106, 108, 110 are magnetically actuated to retract their respective protruding metal portions and move the computing device 100 between locked and unlocked orientations, as described in further detail below, using one or both of a key and a release handle (e.g., keys 252, 352 and release handle 380 of FIG. 3).

The disclosed magnetic locking features are technically advantageous over other locking features in that they provide a simple lock/unlock function to the computing device 100 without occupying much space within the central cavity 126 as the pins 104, 106, 108, 110 are arranged about the base side walls and their respective pin seats are similarly arranged about the top side wall 132. The exterior perimeter positioning of the pins 104, 106, 108, 110 and corresponding pin seats is technically advantageous in that it leaves more space available for the PCB 128 or other internal components that render the computing device 100 functional as compared to other solutions that adopt other mechanical fasteners that are more centrally located within the computing device 100.

Another technical advantage of the disclosed magnetic locking features it that they allow the base 102 to be securely mounted (for example with screws) directly to another object such as a monitor, desk, wall, etc. from the inside of the computing device 100. Therefore, once the top 120 is added to the base 102 and locked, it is extremely difficult to remove the computing device 100 from whatever it is attached to without damaging or destroying it if a key and process (discussed below) is not used. However, in the event that the computing device 100 needs repair, upgrade, or replacement, the computing device 100 may be opened quickly and simply using the key. See also FIG. 6A, described in detail below.

The base 102 further includes a set of base securing ferromagnets 138, 140, 142, 144 spaced apart on the base 102, generally at each of the four corners of the base 102. The top 120 further includes a set of top securing ferromagnets 146, 148, 150, 152 spaced apart on the top 120, generally at each of the four corners of the top 120. The top securing ferromagnets 146, 148, 150, 152 are rendered in broken lines as they are only visible from the non-depicted interior of the top 120, if at all visible. Each of the top securing ferromagnets 146, 148, 150, 152 are vertically aligned with one of the base securing ferromagnets 138, 140, 142, 144 when the top 120 is installed on the base 102. The polar orientation of the base securing ferromagnets 138, 140, 142, 144 and corresponding top securing ferromagnets 146, 148, 150, 152 is such that the top securing ferromagnets 146, 148, 150, 152 attract the base securing ferromagnets 138, 140, 142, 144 and selectively pull the top 120 toward the base 102.

The base securing ferromagnets 138, 140, 142, 144 and corresponding top securing ferromagnets 146, 148, 150, 152 may function as an anti-rattle feature that works to close fit tolerances between the base 102 and the top 120 by applying a attraction force between the base 102 and the top 120 that reduces or prevents any rattling caused by the fit tolerances. Use of the anti-rattle feature is technically advantageous in that it reduces the perception by the user that the computing device 100 is made up of two separate parts, the base 102 and the top 120, that are brought together. This can improve the user experience by suggesting tighter tolerances and continuity, and thus a higher quality computing device 100. This can further reduce the likelihood of a user forcibly attempting to separate the base 102 from the top 120 without use of the proper key as the base 102 and the top 120 may seem less likely to be successfully separated.

Figure 2:
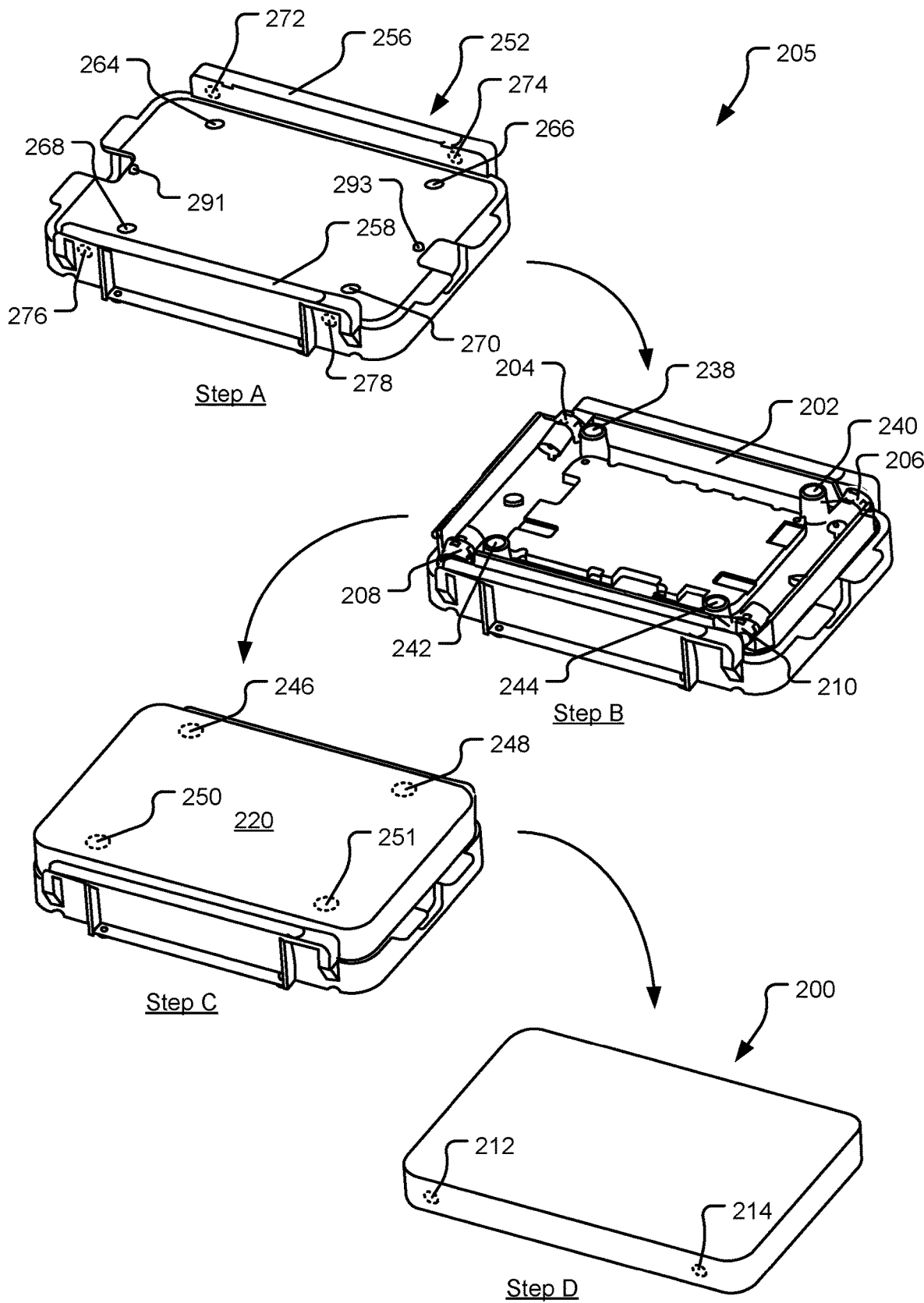
FIG. 2 illustrates an example sequence of steps to actuate a magnetic locking mechanism to assemble a top to a base for a polygonal computing device.

FIG. 2 illustrates an example sequence of steps 205 to actuate a magnetic locking mechanism to assemble a top 220 to a base 202 for a polygonal (specifically, rectangular) computing device 200. An assembly key 252 is provided in Step A. The key 252 is a generally planar component that is selectively attached to a bottom-side of the base 202, as shown in Step B. While the key 252 is depicted as generally rectangular in outline shape, other shapes could function similarly so long as the features discussed below are similarly incorporated. The key 252 selectively interfaces with an outer perimeter of the base 202. The key 252 is used to retract spring-loaded magnetic pins 204, 206, 208, 210 into the base 202 responsive at least to its placement at a predefined position (as illustrated in Step B) with reference to the base 202.

The key 252 includes alignment recesses 264, 266, 268, 270 that correspond to similarly sized and shaped feet in the base 202 (not shown). These recesses 264, 266, 268, 270 ensure that locating pins 291, 293 on the key 252 will fully engage with a similarly sized and shaped locating hole and slot on the underside of the base 202 (not shown). This aligns the base 202 on the key 252 when the base 202 is placed on the key 252 in Step B. Unlock magnets 272, 274, 276, 278 are located and oriented to provide an appropriate level of repulsion force to overcome the spring-loaded magnetic pins 204, 206, 208, 210 plus friction. The key 252, in this instance may be a plastic material that securely locates and holds the unlock magnets 272, 274, 276, 278 in position. The key 252 may also be another non-magnetic material, such as aluminum. In addition to or in lieu of the alignment recesses 264, 266, 268, 270, the base 202 may incorporate a larger overall recess that matches an exterior perimeter of the base 202 so that when the base 202 is placed on the key 252 in Step B, the base 202 aligns properly with the key 252 when it is seated within the recess.

The key 252 further includes side walls 256, 258 that surround the base 202 when the base 202 is placed on the key 252 in Step B. The side walls 256, 258 include the unlock magnets 272, 274, 276, 278 (rendered in broken lines as they may not be visible) in a spaced arrangement about an interior perimeter of the key 252 that align with spring-loaded magnetic pins 204, 206, 208, 210 in the base 202 when the base 202 is aligned properly with the key 252, as shown in Step B. Each of the unlock magnets 272, 274, 276, 278 corresponds to one of the pins 204, 206, 208, 210.

In Step B, the base 202 is placed on the key 252 and the alignment recesses 264, 266, 268, 270 align with corresponding base feet to achieve proper overall alignment. With proper alignment, the unlock magnets 272, 274, 276, 278 are also aligned with the pins 204, 206, 208, 210, respectively, as discussed above. The unlock magnets 272, 274, 276, 278 repel the pins 204, 206, 208, 210 and apply a force that exceeds the spring force that makes the pins 204, 206, 208, 210 biased to an extended position. As a result, the pins 204, 206, 208, 210 are magnetically retracted into the base 202 (e.g., via a repelling force applied by the key 252 in Step B). This is referred to herein as an unlocked orientation or state of the computing device 200.

In Step C, the top 220 is lowered linearly onto the base 202. As the pins 204, 206, 208, 210 are magnetically retracted into the base 202, the top 220 is able to fully seat against the base 202. Further, the top 220 includes top securing ferromagnets 246, 248, 250, 251 (rendered in broken lines as they may not be visible). Each of the top securing ferromagnets 246, 248, 250, 251 are vertically aligned with one of the base securing ferromagnets 238, 240, 242, 244 when the top 220 is installed on the base 202. The polar orientation of the base securing ferromagnets 238, 240, 242, 244 and corresponding top securing ferromagnets 246, 248, 250, 251 is such that the top securing ferromagnets 246, 248, 250, 251 attract the base securing ferromagnets 238, 240, 242, 244 and pull the top 220 toward the base 202.

In Step D, the key 252 is removed from the base 202. As the pins are spring-loaded to be extended, removal of the key 252 from the base 202 allows each of the spring-loaded magnetic pins to engage with one of the seats (e.g., seats 212, 214) in the top 220 to prevent the top 220 lifting away from the base 102. This is referred to herein as a locked orientation or state of the computing device 200.

Figure 3:
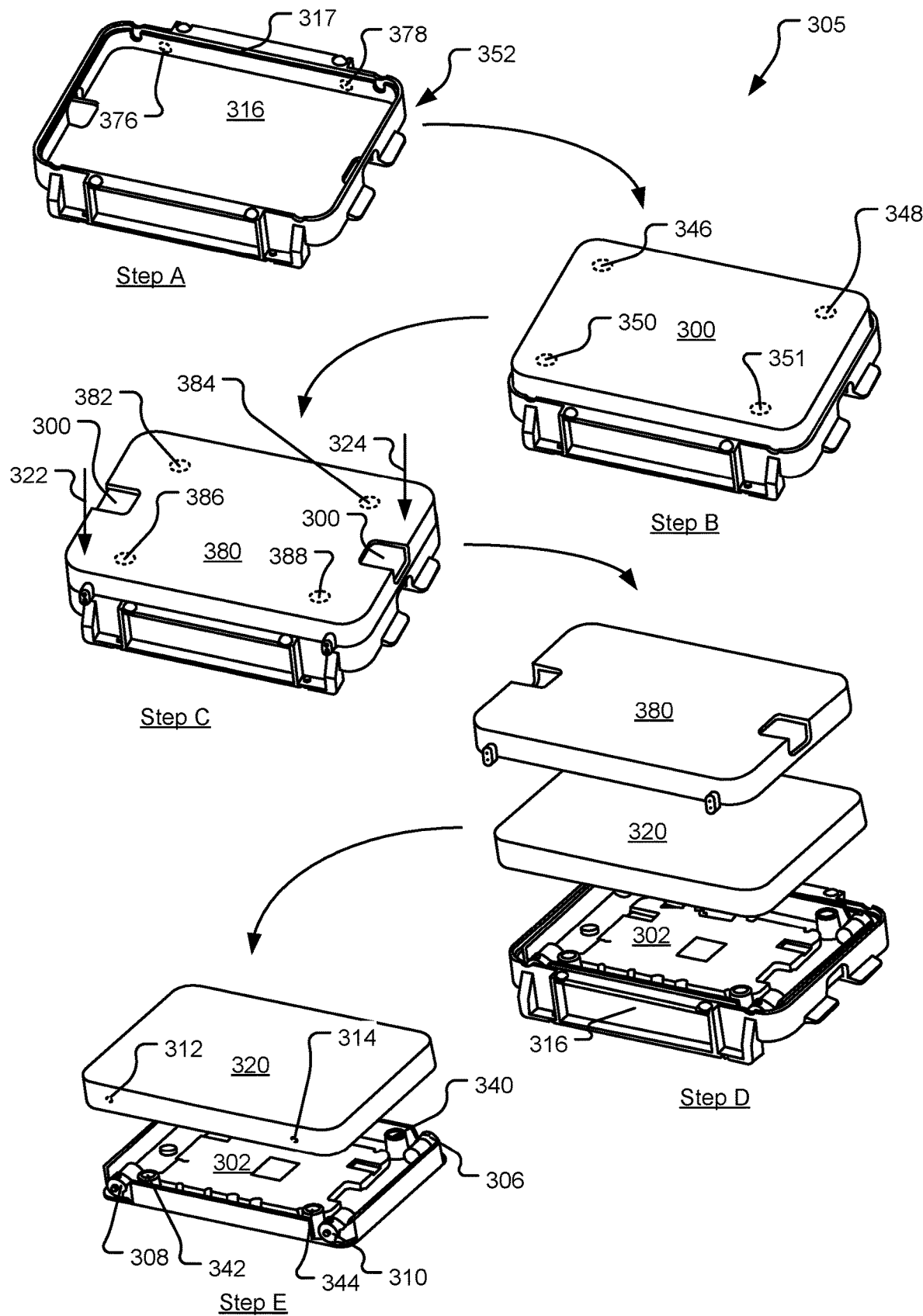
FIG. 3 illustrates an example sequence of steps to actuate a magnetic locking mechanism to disassemble a top from a base for a polygonal computing device.

FIG. 3 illustrates an example sequence of steps 305 to actuate a magnetic locking mechanism to disassemble a top 320 from a base 302 for a polygonal (specifically, rectangular) computing device 300. A disassembly key 352 is provided in Step A. The disassembly key 352 may be a completely separate component from the assembly key 252 of FIG. 2, or the keys 252, 352 may be combined on opposite sides of the same structure to reduce part count. The key 352 is a generally planar component with an interior recess 316 with a stepped outer perimeter 317. The stepped outer perimeter 317 allows the bottom-side of the computing device 300 to be placed within the key 352, as shown in Step B with an outer perimeter edge of the top 320 resting on the stepped outer perimeter 317. The base 302 is unencumbered by the key 352 and suspended over the interior recess 316 so long as the base 302 is attached to the top 320. Various other features of the key 352 may be as described above with reference to key 252 of FIG. 2, discussed above.

In Step B, the computing device 300 is placed on the key 352. As noted above, the base 302 is unencumbered by the key 352 and suspended over the interior recess 316 so long as the base 302 is attached to the top 320. At Step B, one of two locking systems is been disengaged. Spring-loaded magnetic pins (e.g., pins 306, 308, 310 are moved to an unlocked state by corresponding unlock magnets (e.g., unlock magnets 376, 378 in the key 352, rendered in broken lines as they may not be visible). However, the top 320 remains locked to the base 302 due to the attraction force of the base securing ferromagnets (e.g., base securing ferromagnets 340, 342, 344) and corresponding top securing ferromagnets 346, 348, 350, 351. This provides an extra level of security against unauthorized disassembly. Further, the base securing ferromagnets (e.g., base securing ferromagnets 340, 342, 344) and the corresponding top securing ferromagnets 346, 348, 350, 351 work as an anti-rattle mechanism to close fit tolerances between the base 302 and the top 320 by applying an attraction force between the base 302 and the top 320. Both the locking and the anti-rattle mechanisms operate to keep the base 302 and the top 320 attached and both must be defeated to separate the base 302 from the top 320.

Step C illustrates an example release handle (or eject key) 380 aligned over the computing device that is used to release (or eject) the top 320 from the underlying base 302 by defeating or releasing (ejecting) both the locking and the anti-rattle (or secondary locking) mechanisms. The release handle 380 counters and overcomes the attraction force between the base securing ferromagnets and corresponding top securing ferromagnets 346, 348, 350, 351 that are holding the top 320 to the base 302.

The release handle 380 further includes a set of handle releasing ferromagnets 382, 384, 386, 388 spaced apart on the release handle 380, each of the handle releasing ferromagnets 382, 384, 386, 388 corresponding to one of base securing ferromagnets (e.g., base securing ferromagnets 340, 342, 344. The handle releasing ferromagnets 382, 384, 386, 388 repel the base securing ferromagnets and push the base 302 away from the top 320. The repelling force applied by the handle releasing ferromagnets 382, 384, 386, 388 against the base securing ferromagnets overcomes the resisting attractive force provided between the base securing ferromagnets and the top securing ferromagnets 346, 348, 350, 351. This releases the anti-rattle mechanism for the computing device 300. When the release handle 380 is pressed downward, as illustrated by arrows 322, 324, the base 302 is permitted to fall into the interior recess 316 by force of gravity and magnetic repulsion. The distance the base 302 falls is great enough that the attractive force provided between the top securing ferromagnets 346, 348, 350, 351 and the base securing ferromagnets cannot overcome the force of gravity, even when the release handle 380 is removed from the computing device 300, as shown in Step D.

In Step D, the release handle 380 is illustrated as free to be lifted linearly away from the top 320 and is easily separated from the top by the repelling force applied by the handle releasing ferromagnets 382, 384, 386, 388 against the top securing ferromagnets 346, 348, 350, 351. The top 320 is further free to be lifted linearly away from the base 302 with the spring-loaded magnetic pins (e.g., pins 306, 308, 310) still retracted into the base 302 using the key 352. In Step E, the base 302 is removed from the key 352 thereby allowing the spring-loaded magnetic pins to return to their respective extended positions. However, as the top 320 is now lifted away from the base 302, the spring-loaded magnetic pins do not reengage the pin seats in the top 320.

Figure 4A:
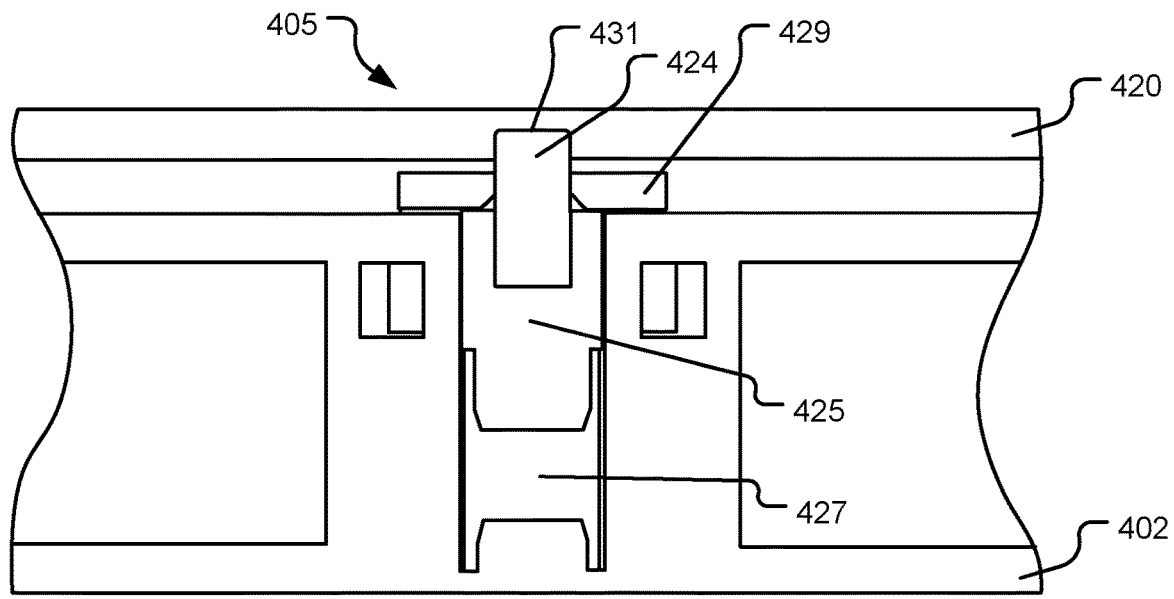
FIG. 4A illustrates a top section view of a magnetic locking mechanism for a polygonal computing device in a locked state.

FIG. 4A illustrates a top section view of a magnetic locking mechanism 405 for a polygonal (specifically, rectangular) computing device in a locked state. The mechanism 405 includes a base magnetic locking feature embedded within a perimeter of a base 402 and a top magnetic locking feature embedded within a perimeter of a top 420. The base magnetic locking feature includes a spring-loaded magnetic pin 424 seated in a plunger 425 that is spring-biased using preloaded compression spring 427 to the depicted protruding orientation with reference to a surrounding pin housing. The magnetic pin 424 protrudes through a plunger cap 429 that keeps the magnetic pin 424 centered as it protrudes out of the plunger 425. The top magnetic locking feature includes a seat 431 in the top 420 for the spring-loaded magnetic pin 424. In the depicted locked state, the spring-loaded magnetic pin 424 is engaged with the seat 431 in the top 420 to prevent the top 420 from lifting with reference to the base 402.

Figure 4B:
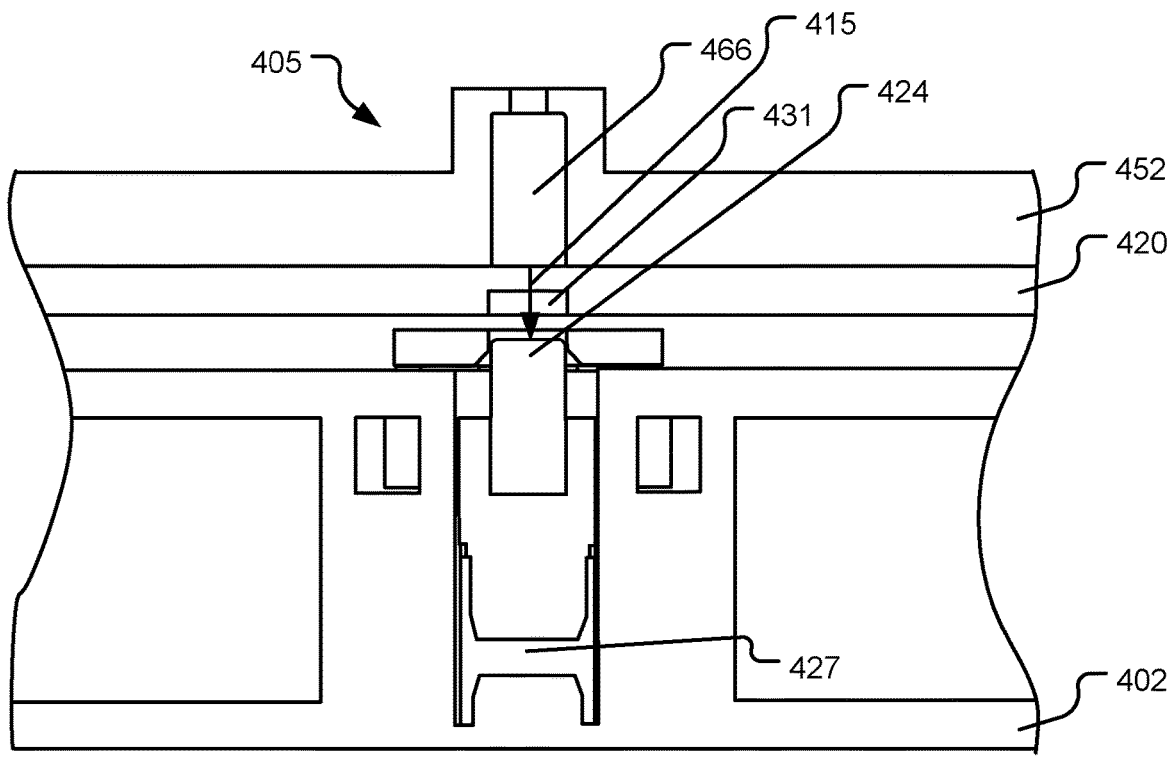
FIG. 4B illustrates the magnetic locking mechanism of FIG. 4A in an unlocked state.

FIG. 4B illustrates the magnetic locking mechanism 405 of FIG. 4A in an unlocked state. A key (or handle) 452 is selectively attached to (or brought in close proximity to) the computing device. The key (or handle) 452 includes an unlock magnet 466 embedded within the key (or handle) 452 that is aligned with the base and top magnetic locking features of the mechanism 405. The unlock magnet 466 and the magnetic pin 424 have polar orientations that push away from one another. This causes the magnetic pin 424 to overcome the force applied by the spring 427 and retract, exiting the seat 431 as illustrated by arrow 415. With the magnetic pin 424 disengaged from the seat 431, the computing device is placed in an unlocked orientation and the top 420 is free to lift away from the base 402.

While only one magnetic locking mechanism 405 is illustrated in FIGS. 4A and 4B, the key (or handle) 452 may include an array of magnetic locking mechanisms spaced apart on the key (or handle) 452 that corresponds to a similar arrangement of spring-loaded magnetic pins in the base 402. In some implementations, the positioning and polar orientations of the array of magnetic locking mechanisms may be used as a security measure that would prevent or reduce the likelihood of a user being able to disengage all the magnetic locking mechanisms simultaneously using a magnet or series of magnets placed around the base 402. Further, with a repelling magnetic action being used, a collection of separate magnets would be difficult to use in place of the key (or handle) 452 as they would be individually pushed away from locations where they unlock one of the magnetic locking mechanisms.

As such, while a singular magnetic locking mechanism and corresponding unlock magnet 466 in the key (or handle) 452 is shown in FIGS. 4A and 4B, any number of magnetic locking mechanisms and corresponding unlock magnets may be used to achieve a desired level of security and overall performance (e.g., FIG. 1 illustrates four spring-loaded magnetic pins 104, 106, 108, 110 in the base 102 and there are a corresponding four pin seats in the top 120, these in combination forming magnetic locking features). The base magnetic locking features, top magnetic locking features, and key magnets may be equidistantly or non-equidistantly spaced, particularly to meet packaging requirements within the computing device.

The magnetic locking mechanisms disclosed herein are technically advantageous over the existing solutions in that they provide selective authorized access to an interior of the computing device, without utilizing exposed fasteners, which have a variety of disadvantages as described above. The magnetic locking mechanisms disclosed herein further permit a rapid assembly and disassembly process for an authorized user that possesses the key (or handle) 452 (or tooling that includes the key (or handle) 452), which is technically advantageous over existing solutions that adopt multiple screwed connections, the sum of which may take significantly longer to assemble and disassemble. Further, screw fasteners add additional part cost, which can be avoided by the presently disclosed magnetic locking mechanisms. Still further, the presently disclosed magnetic locking mechanisms avoid the additional expense of a finishing cover (e.g., to conceal screw holes), as well as the reduced recyclability of an end product that incorporates a finishing cover. Further still, as the base plate 702 and the top enclosure 720 can quickly and easily be separated using the key (or handle) 452, the presently disclosed magnetic locking mechanisms support recyclability of the computing device by allowing its constituent components to be more quickly and easily separated into their respective recycling streams. A computing device incorporating the magnetic locking mechanisms disclosed herein is further technically advantageous over existing computing devices as it is secure and relatively tamper-proof so long as the key (or handle) 452 is not available. The absence of exposed fasteners or other exposed features such as that found in existing computing devices that would otherwise invite tampering discourages the same of the computing device.

The number and placement of each of the individual spring-loaded magnetic pins within the base 402 and corresponding placement of individual unlock magnets embedded within the key (or handle) 452 can be varied to increase the difficulty of reproducing a magnetic key that would serve to lock and unlock the magnetic locking mechanism 405. This complexity allows for multiple varied keys in use across a system of numerous computing devices. These keys are truly used as such because only the correct key will open each specific computing device. This is technically advantageous in that it increases security of a corresponding computing device in that possession of an authorized key is needed to open the computing device.

Figure 5A:
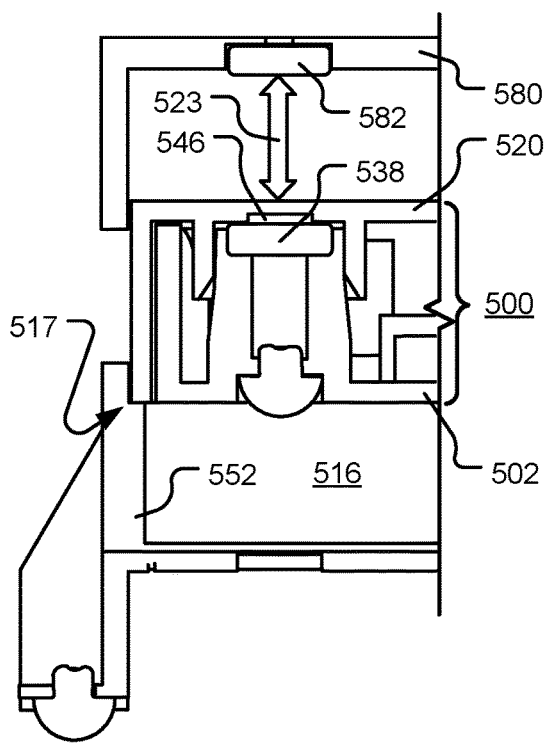
FIG. 5A illustrates an elevation section view of an example computing device resting in a disassembly key, where a base of the computing device is attached to a top of the computing device.
Figure 5B:
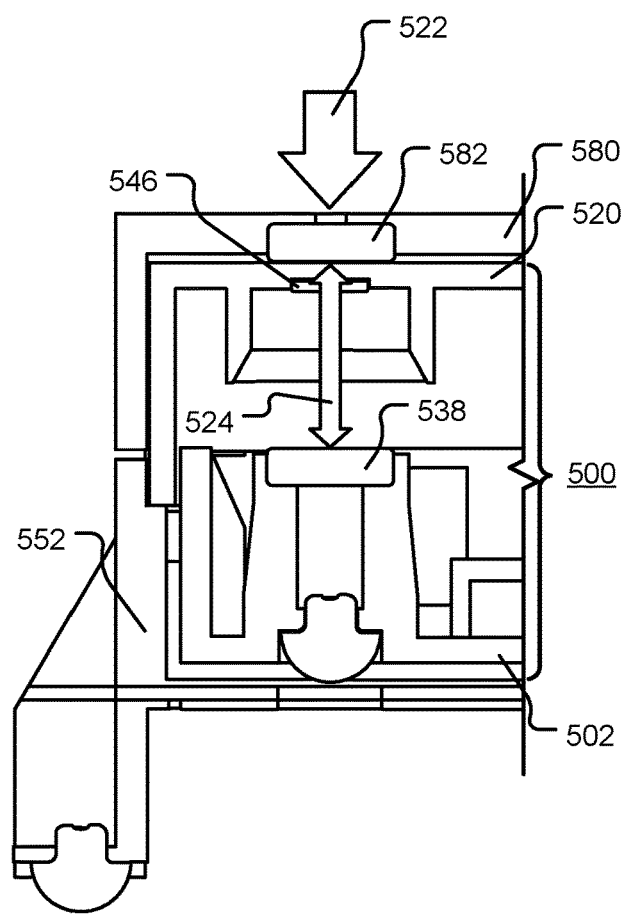
FIG. 5B illustrates the base released from the top of the computing device of FIG. 5A using a disassembly handle.

FIG. 5A illustrates an elevation section view of an example computing device 500 resting in a disassembly key 552, where a base 502 of the computing device 500 is attached to a top 520 of the computing device 500. The key 552 includes an interior recess 516 with a stepped outer perimeter 517. The stepped outer perimeter 517 allows the bottom-side of the computing device 500 to be placed within the key 552, as shown in FIG. 5A with an outer perimeter edge of the top 520 resting on the stepped outer perimeter 517. The base 502 is unencumbered by the key 552 and suspended over the interior recess 516 so long as the base 502 is attached to the top 520. FIG. 5B illustrates the base 502 released from the top 520 of the computing device 500 of FIG. 5A using a release handle 580. The release handle 580 is aligned over the computing device 500 and is used to release (or eject) the top 520 from the underlying base 502 by defeating or releasing (ejecting) both locking and anti-rattle (or secondary locking) mechanisms.

The release handle 580 further includes a set of handle releasing ferromagnets (e.g., handle releasing ferromagnet 582) spaced apart on the release handle 580, each of the handle releasing ferromagnets corresponding to one of a matching set of base securing ferromagnets (e.g., base securing ferromagnet 538) that repel one another, as illustrated by arrow 523 of FIG. 5A. When the release handle 580 is pressed downward, as illustrated by arrow 522 of FIG. 5B, the handle releasing ferromagnets repel the base securing ferromagnets and push the base 502 away from the top 520. The repelling force applied by the handle releasing ferromagnets against the base securing ferromagnets overcomes the resisting attractive force provided between the base securing ferromagnets and top securing ferromagnets (e.g., top securing ferromagnet 546). This releases a secondary lock (that may function as an anti-rattle mechanism) for the computing device 300.

When the release handle 580 is pressed downward, as illustrated by arrow 522, the locking and anti-rattle mechanisms are released/overcome and the base 502 is ejected into or otherwise permitted to fall into the interior recess 516 by the repelling force and force of gravity, as illustrated by arrow 524. The distance the base 502 falls is great enough that the attractive force provided between the top securing ferromagnets and the base securing ferromagnets cannot overcome the force of gravity, even when the release handle 580 is removed from the computing device 500.

In FIG. 5B, the release handle 580 is free to be lifted linearly away from the top 520 and is easily separated from the top 520 by a repelling force applied by the handle releasing ferromagnets against the top securing ferromagnets. The top 520 is further free to be lifted linearly away from the base 502 with the spring-loaded magnetic pins still retracted into the base 502 using the key 552. The key 352 may then be removed from the base 502, thereby allowing the pins to return to their respective extended positions. However, as the top 520 is now lifted away from the base 502, the pins do not reengage the pin seats in the top 520.

Figures 6A, 6B:
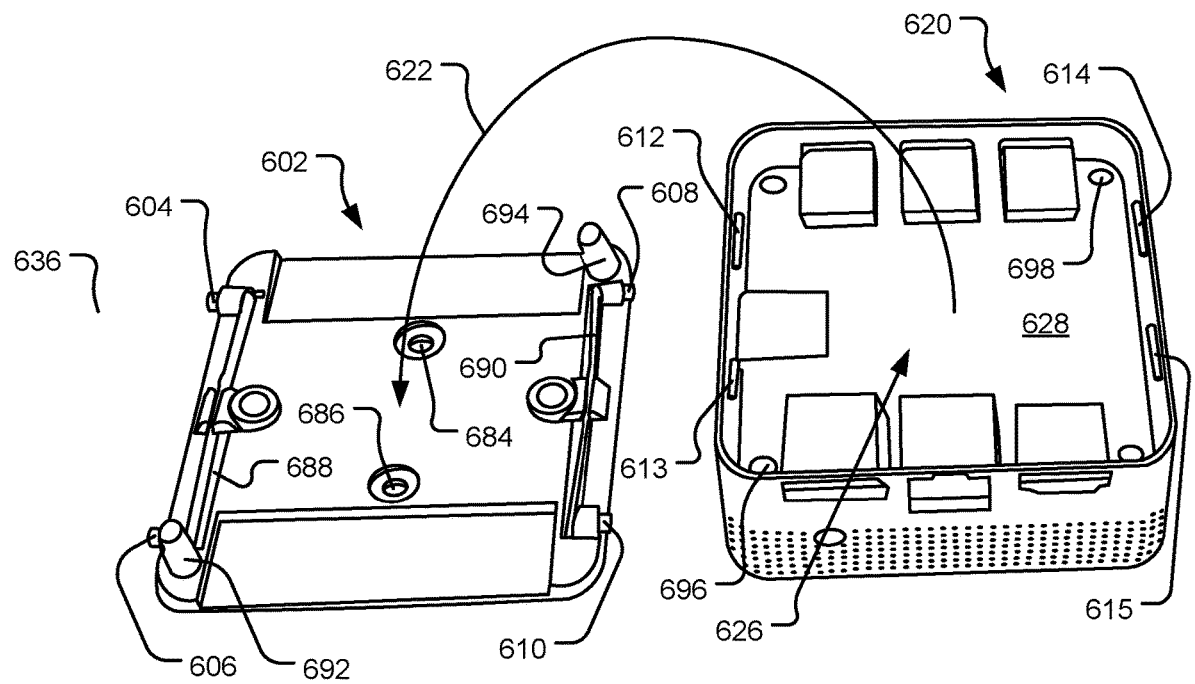
FIG. 6A illustrates an example base plate that adopts spring-loaded magnetic pins and an example top enclosure that adopts corresponding pin seats that together form a magnetic locking mechanism.
FIG. 6B illustrates the base plate and the top enclosure of FIG. 6A assembled together to form a polygonal computing device.

FIG. 6A illustrates another implementation of the presently disclosed technology with a singular locking mechanism. It includes an example base plate 602 that adopts spring-loaded magnetic pins 604, 606, 608, 610 and an example top enclosure 620 that adopts corresponding pin seats (not shown) that together form a magnetic locking mechanism or system. Four features of the base 602 receive the magnetic locking pins 604, 606, 608, 610 and allow them to slide with low friction. Features 612, 613, 614, 615 are vertical stops that interact with corresponding features on the base 602 to help add impact robustness when the computing device 600 is dropped. These features would take some of the impact load so that the pins 604, 606, 608, 610 do not take all of it. Interior sides of each of the base plate 602 and the top enclosure 620 are illustrated in FIG. 6A. The top enclosure 620, when flipped and combined with the base plate 602, as illustrated by arrow 622, serves as a housing that defines an enclosure for computing device 600 (see FIG. 6B). A central cavity (or interior recess) 626 in the top enclosure 620 encloses a variety of internal components and computing hardware (e.g., printed circuit board (PCB) 628) that render the computing device 600 functional as such. The top enclosure 620 is generally rectangular with an open bottom that is covered when the base plate 602 is attached (or responsive at least to attachment of the base plate 602). The top enclosure 620 is selectively attached to the base plate 602 in order to secure the internal components within the central cavity 626 and seal the interior of the computing device 600 from external contamination.

The base plate 602 includes fastener holes 684, 686 that may be used to attach the base plate 602 to a fixed structure, such as a desk or table. Further, as the fastener heads are concealed within the computing device 600, the computing device 600 is not removable from the fixed structure when the computing device 600 is assembled and locked. This is technically advantageous as a security measure and measure taken against theft of the computing device 600.

The resulting computing device 600 is a sleek rectangular puck form factor. An example implementation may be 50-100 mm in width and length and 20-40 mm in height. The rectangular interior perimeter of the top enclosure 620 fits over the rectangular exterior perimeter of the base plate 602 where the rectangular interior perimeter of the top enclosure 620 surrounds the rectangular exterior perimeter of the base plate 602. The pins 604, 606, 608, 610 are each used in conjunction with corresponding pin seats to create the magnetic locking mechanism for the computing device 600. The pins 604, 606, 608, 610 are arranged in a spaced manner, as shown, to distribute the locking mechanism about the exterior perimeter of the base plate 602. The pins 604, 606, 608, 610 are designed so that protruding metal portions extend outward from the base plate 602, e.g., via spring force applied by leaf springs 688, 690.

The pin seats are similarly arranged in a spaced manner on the interior perimeter of the top enclosure 620. The pin seats are protrusions in the interior perimeter of the top enclosure 620 sized, shaped, and located to receive the pins 604, 606, 608, 610 in a locked orientation of the computing device 600. Specifically, the pins 604, 606, 608, 610 protrude outwardly from the rectangular interior perimeter of the side walls of the base plate 602 and are secured by the pin seats when they are extended.

The pins 604, 606, 608, 610 are placed in FIG. 6A on opposing sides of the rectangular exterior perimeter of the base 102, generally in each of the four corners of the base plate 602. This effectively spreads locking forces across the length and width of the base plate 602. Other implementations may adopt one or more similar pins in all sides of the rectangular exterior perimeter of the base, either in the corners (as illustrated) or elsewhere on each side. The pin seats are similarly arranged on opposing sides (as shown) or all sides of the interior perimeter of the top enclosure 620.

Each pin protruding from the base plate 602 engages with one of the pin seats in the top enclosure 620 in the locked orientation. In the locked orientation of the top enclosure 620 with reference to the base plate 602, the pin seats secure the pins 604, 606, 608, 610 prevent the top enclosure 620 from lifting linearly away from the base plate 602. In an unlocked orientation of the top enclosure 620 with reference to the base plate 602, each pin is retracted from its respective pin seat. In the unlocked rotational orientation, the top enclosure 620 is free to be selectively lifted linearly away from the base plate 602 as mating surfaces and tolerances between the base plate 602 and the top enclosure 620 may only permit linear movement. The pins 604, 606, 608, 610 are magnetically actuated to retract their respective protruding metal portions and move the computing device 600 between locked and unlocked orientations, using a key (e.g., key 752 of FIG. 7).

The base plate 602 includes alignment pins 692, 694 that protrude upward from the base plate 602 and into corners of the enclosure created by the base plate 602 and the top enclosure 620 combined. Apertures 696, 698 in the top enclosure 620 align with the alignment pins 692, 694 and support attaching the base plate 602 to the top enclosure 620 by providing physical alignment guides. This is technically advantageous in that it speeds installation of the base plate 602 to the top enclosure 620 and reduces the likelihood for error in the installation.

In some implementations, the base plate 602 further includes a set of base securing ferromagnets spaced apart on the base plate 602, generally on opposing sides of the base plate 602. The top enclosure 620 further includes a matching set of top securing ferromagnets spaced apart on the top enclosure 620. The top securing ferromagnets attract the base securing ferromagnets and selectively pull the top enclosure 620 toward the base plate 602. The base securing ferromagnets and corresponding top securing ferromagnets may function as an anti-rattle feature that works to close fit tolerances between the base plate 602 and the top enclosure 620 by applying a attraction force between the base plate 602 and the top enclosure 620 that reduces or prevents any rattling caused by the fit tolerances. FIG. 6B illustrates the base plate and the top enclosure of FIG. 6A assembled together to form a rectangular computing device.

An example use case for the computing device 600 is as a cloud computer where no storage or critical information is stored on the computing device 600. In a large deployment of such computing devices across a company site, the company's IT department can have spare computing devices on hand ready to replace failed computing devices. For example, an IT person gets a replacement request, they bring a spare, remove the failed top enclosure 620 with a disassembly key. The old base plate 602 remains attached and the IT person assembles a new top enclosure on the old plate base 602 with an assembly key (in various implementations, the assembly and disassembly keys may or may not be the same part). The user is only down for a few minutes as the replacement of the failed top enclosure 620 with a new top enclosure is accomplished quickly using the assembly and disassembly keys.

Figure 7:
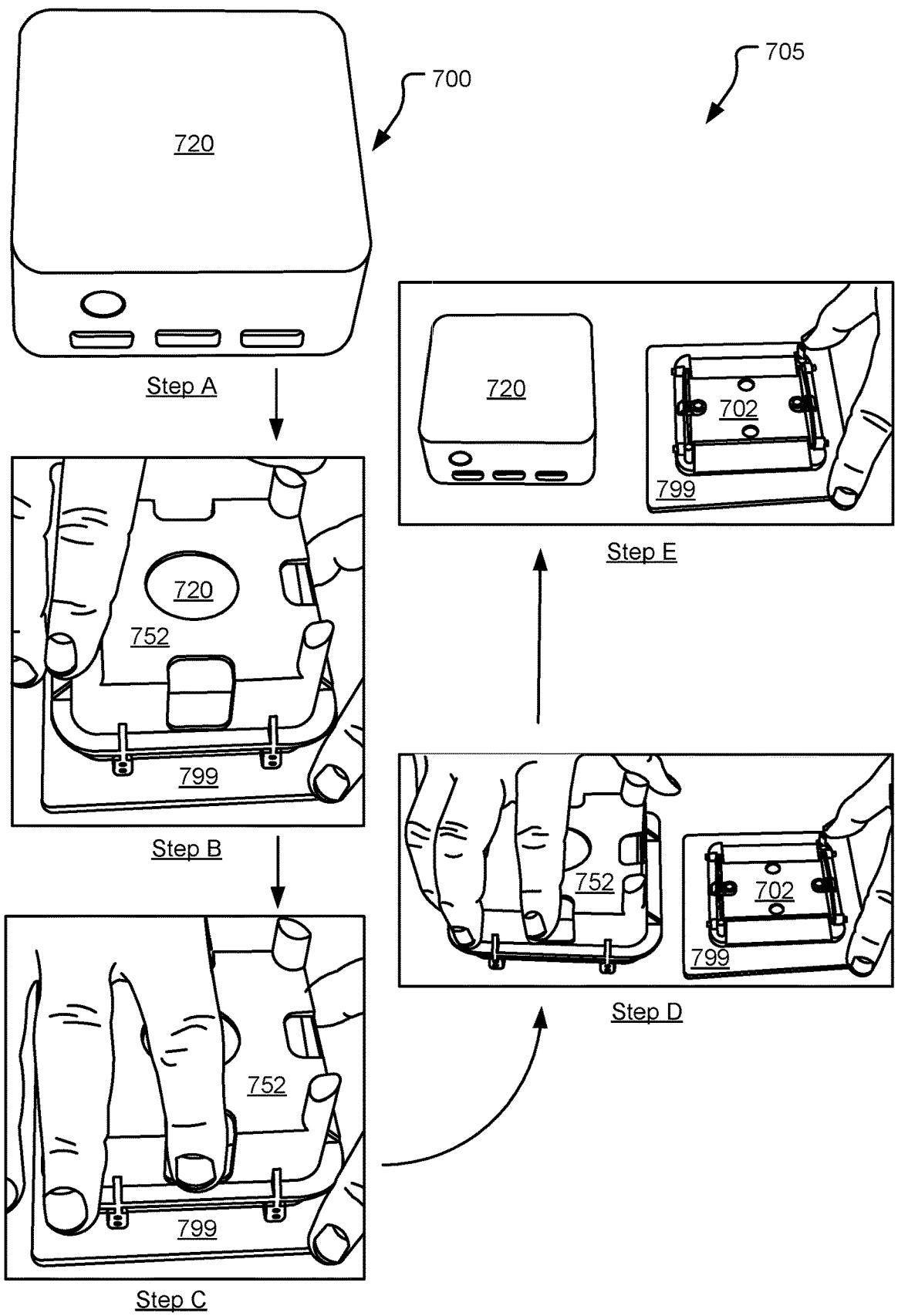
FIG. 7 illustrates an example sequence of steps to actuate a magnetic locking mechanism to disassemble a top enclosure from a base plate for a polygonal computing device.

FIG. 7 illustrates an example sequence of steps 705 to actuate a magnetic locking mechanism to disassemble a top enclosure 720 from a base plate 702 for a polygonal (specifically, rectangular) computing device 700. The computing device 700 is provided in Step A. The computing device 700 is in a locked orientation with spring-loaded magnetic pins protruding from the base plate 702, each of which engaged with one of pin seats in the top enclosure 720 (see e.g., FIG. 6A). In some implementations, base securing ferromagnets and corresponding top securing ferromagnets work as an anti-rattle mechanism (or secondary lock mechanism) to close fit tolerances between the base plate 702 and the top enclosure 720 by applying an attraction force between the base plate 702 and the top enclosure 720 (see e.g., FIG. 1). Both the locking and the anti-rattle mechanisms operate to keep the base plate 702 and the top enclosure 720 attached and both must be defeated or overcome (if present) to separate the base plate 702 from the top enclosure 720. The base plate 702 is attached to a fixed structure 799 (illustrated as a plate in FIG. 7, for illustration).

A disassembly key 752 is provided in Step B. The key 752 is a generally prismatic component with an interior recess to receive the computing device 700 to unlock the magnetic locking mechanism. In Step B, the key 752 is placed on the computing device 700 and a user presses downward on the key 752, as illustrated.

As noted above, the key 752 is used to release the top enclosure 720 from the underlying base plate 702 by defeating or releasing both the locking mechanism and the anti-rattle mechanism (if present). Side walls of the key 752 include unlock magnets in a spaced arrangement about an interior of the key 752 that align with the spring-loaded magnetic pins in the base plate 702 when the key 752 is pressed downward. Each of the unlock magnets corresponds to one of the pins. When the key 752 is pressed downward, the unlock magnets repel the pins out of their respective pin seats in the top enclosure 720 by applying a force that exceeds the spring force that makes the pins biased to an extended position. As a result, the pins are magnetically retracted into the base plate 702 (e.g., via a repelling force applied by the key 752), thereby unlocking the top enclosure 720 from the base plate 702. This releases the locking mechanism for the computing device 700.

In some implementations, the key 752 further includes a set of handle releasing ferromagnets (see e.g., FIG. 3) spaced apart on the key 752, each of the handle releasing ferromagnets corresponding to one of the base securing ferromagnets. The handle releasing ferromagnets repel the base securing ferromagnets and push the base plate 702 away from the top enclosure 720. The repelling force applied by the handle releasing ferromagnets against the base securing ferromagnets overcomes the resisting attractive force provided between the base securing ferromagnets and the top securing ferromagnets (see also FIG. 3). This releases the anti-rattle mechanism for the computing device 700. When the key 752 is pressed downward, the base plate 702 is pushed away from the top enclosure 720, with only the fixed structure 799 holding it in place.

In Step C, the user reaches through apertures in the key 752 to grasp the top enclosure 720 with their fingers in a pinching action. In Step D, the user lifts the key 752 and the top enclosure 720 linearly away from the base plate 702. The top enclosure 720 is free to be lifted linearly away from the base plate 702 with the spring-loaded magnetic pins retracted into the base plate 702 using the key 752. With the key 752 removed, the pins return to their respective extended positions, as shown in Step D once the key 752 (and accompanying top enclosure 720) are removed. In Step E, the key 752 is lifted away from the top enclosure 720. The steps 705 may be generally performed in reverse order to re-assemble the computing device 700.

Four example use cases provide increasing levels of anti-theft security: 1) anti-tamper desktop—The device 700 is locked and not attached to anything. 2) anti-tamper, anti-theft level 1—The device 700 is locked and attached to something thing, typically much larger (e.g., a monitor, desk, wall, etc.) with screws accessible from the outside of the device 700. 3) anti-tamper, anti-theft level 2—The device 700 is locked and attached to something like a desk with a Kensington lock. 4) anti-tamper, anti-theft level 3—The device 700 is locked and attached to something, typically much larger (monitor, desk, wall, etc.) with screws accessible from the inside of the device 700.

Figure 8:
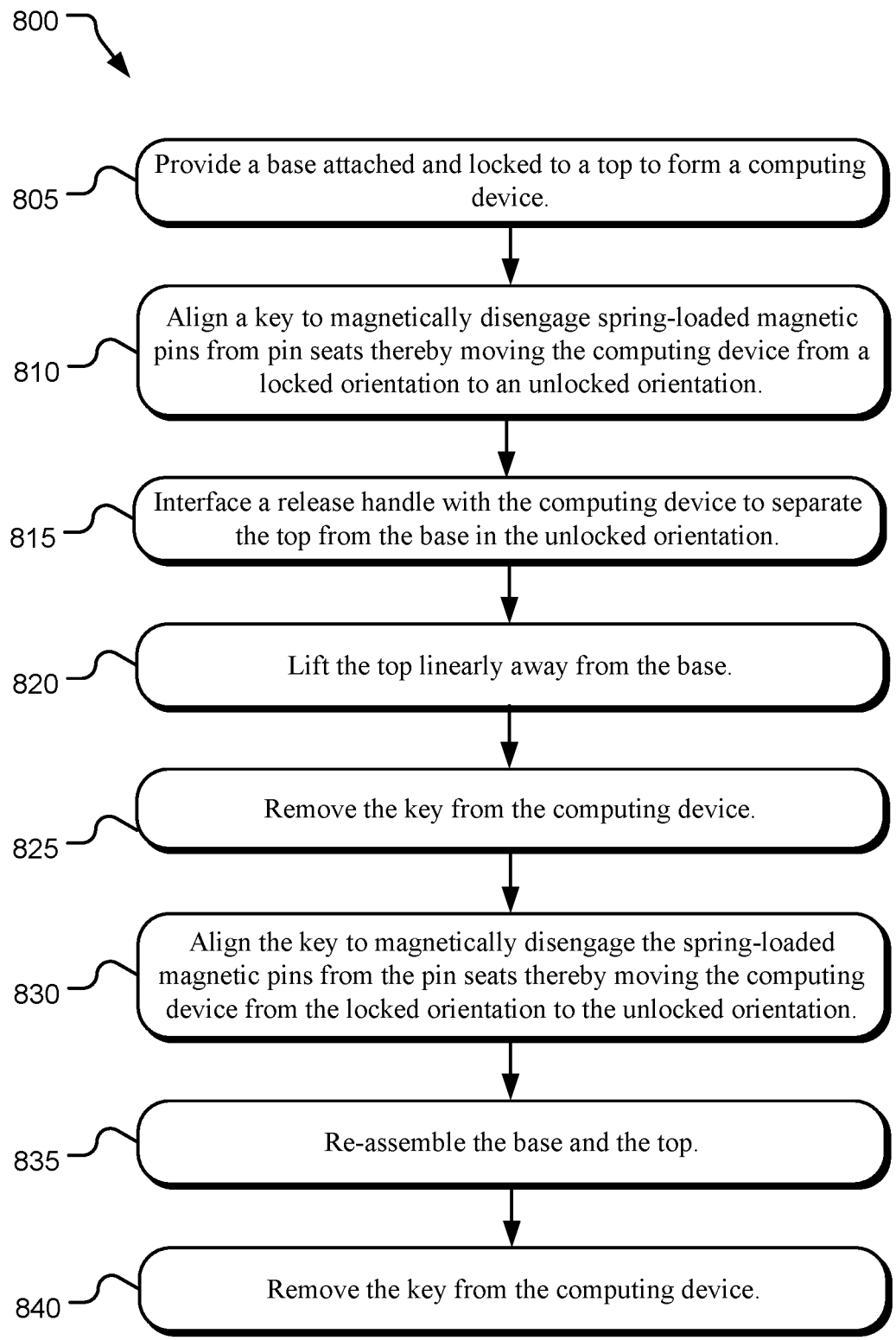
FIG. 8 illustrates example operations for attaching a top to a base to assemble a polygonal computing device and removing the top from the base to disassemble the polygonal computing device using a magnetic locking mechanism.

FIG. 8 illustrates example operations 800 for attaching a top to a base to assemble a polygonal (specifically, rectangular) computing device and removing the top from the base to disassemble the rectangular computing device using a magnetic locking mechanism. Providing operation 805 provides a base attached and locked to a top to form the computing device. The base includes a rectangular exterior perimeter and a set of spring-loaded magnetic pins in a spaced arrangement about the exterior perimeter of the base. The spring-loaded magnetic pins are biased to extend outward from the base.

The top includes a rectangular interior perimeter to fit over the base. The rectangular interior perimeter of the top surrounds the rectangular exterior perimeter of the base. The top further includes a set of pin seats in a spaced arrangement about the interior perimeter of the top, each of the pin seats corresponding to one of the spring-loaded magnetic pins. The pin seats receive the spring-loaded magnetic pins to prevent the top from lifting linearly away from the base. The spring-loaded magnetic pins and the pin seats selectively lock the computing device together to prevent the top from being lifted linearly from the base.

Operations 810-825 are performed to dis-assemble a computing device using a magnetic locking mechanism. Operations 830-840 are performed to re-assemble the computing device. The operations 800 may be performed manually by assembly or service personnel, or mechanically by assembly or dis-assembly equipment as part of a pick-and-place process.

An aligning operation 810 aligns a key to magnetically disengage the spring-loaded magnetic pins from the pin seats thereby moving the computing device from the locked orientation to an unlocked orientation. In various implementations, the key may be placed adjacent the top or the base of the computing device and may adopt various features to achieve correct alignment with the computing device to move from the locked orientation to the unlocked orientation. An interfacing operations 815 interfaces a release handle with the computing device to separate the top from the base in the unlocked orientation.

A lifting operation 820 lifts the top linearly away from the base. Maintenance or repair operations can then be performed on internal components of the computing device. A removing operation 825 removes the key from the computing device, thereby moving the computing device from the unlocked orientation to the locked orientation in a disassembled state.

A second aligning operation 830 aligns the key to magnetically disengage the spring-loaded magnetic pins from the pin seats thereby moving the computing device from the locked orientation to the unlocked orientation. A re-assembling operation 835 re-assembles the base and the top. A second removing operation 840 removes the key from the computing device, thereby moving the computing device from the unlocked orientation to the locked orientation.

The operations making up the embodiments of the presently disclosed technology described herein are referred to variously as operations, steps, objects, method steps, or modules. Furthermore, the operations may be performed in any order, adding or omitting operations as desired, unless explicitly claimed otherwise or a specific order is inherently necessitated by the claim language.

The presently disclosed technology may include a computing device comprising a base, a top and computing hardware. The base includes a polygonal exterior perimeter and a set of spring-loaded magnetic pins in a spaced arrangement about the exterior perimeter of the base. The spring-loaded magnetic pins biased to extend away from the base. The top includes a polygonal interior perimeter to fit over the base, the polygonal interior perimeter of the top to surround the polygonal exterior perimeter of the base, and a set of pin seats in a spaced arrangement about the interior perimeter of the top, each of the pin seats corresponding to one of the spring-loaded magnetic pins. The pin seats selectively receive the spring-loaded magnetic pins to prevent the top from lifting linearly away from the base. The computing hardware is mounted within an interior recess in one or both of the base and the top.

In some implementations, the base is a base plate and the top is a top enclosure, and the computing hardware is mounted within the interior recess in the top enclosure.

In some implementations, the base is a base enclosure and the top is a top enclosure, and the computing hardware is mounted within the interior recess in the base enclosure.

The computing device may further comprise a key to selectively interface with an outer perimeter of the base, the key to retract the spring-loaded magnetic pins into the base responsive at least to its placement at a predefined position with reference to the computing device.

In some implementations, the top is free to be lifted linearly away from the base with the spring-loaded magnetic pins retracted into the base using the key.

In some implementations, the key includes a set of unlock magnets in a spaced arrangement about an interior perimeter of the key, each of the unlock magnets corresponding to one of the spring-loaded magnetic pins, wherein the unlock magnets are arranged to repel the spring-loaded magnetic pins out of their respective pin seats responsive at least to the key's placement at the predefined position with reference to the computing device.

In some implementations, the base further includes a set of base securing ferromagnets spaced apart on the base; and the top further includes a set of top securing ferromagnets spaced apart on the top, each of the top securing ferromagnets corresponding to one of the base securing ferromagnets, the top securing ferromagnets to attract the base securing ferromagnets and selectively pull the top toward the base.

In some implementations, the attraction between the top securing ferromagnets and the base securing ferromagnets provides an anti-rattle feature that closes a tolerance between the base and the top.

The computing device may further comprise a release handle including a set of handle releasing ferromagnets spaced apart on the handle, each of the handle releasing ferromagnets corresponding to one of the top securing ferromagnets, the handle releasing ferromagnets to repel the top securing ferromagnets and selectively eject the base from the top responsive to the spring-loaded magnetic pins being repelled out of their respective pin seats.

In some implementations, the base and the top in combination form a cavity for enclosing components of the computing device.

In some implementations, the spaced arrangement of spring-loaded magnetic pins includes spring-loaded magnetic pins on opposing sides of the polygonal exterior perimeter of the base; and the spaced arrangement of pin seats includes pin seats on opposing sides of the interior perimeter of the top.

In some implementations, the spaced arrangement of spring-loaded magnetic pins includes spring-loaded magnetic pins on all sides of the polygonal exterior perimeter of the base; and the spaced arrangement of pin seats includes pin seats on all sides of the interior perimeter of the top.

The presently disclosed technology may further include a method of using a magnetic locking mechanism to detach a top from a base of a computing device, comprising aligning a key with the base and the top. The base includes a polygonal exterior perimeter; and a set of spring-loaded magnetic pins in a spaced arrangement about the exterior perimeter of the base, the spring-loaded magnetic pins biased to extend away from the base. The top includes a polygonal interior perimeter to fit over the base, the polygonal interior perimeter of the top to surround the polygonal exterior perimeter of the base; and a set of pin seats in a spaced arrangement about the interior perimeter of the top, each of the pin seats corresponding to one of the spring-loaded magnetic pins, the pin seats to selectively receive the spring-loaded magnetic pins to prevent the top from lifting linearly away from the base, wherein the top is attached to the base in a locked orientation, wherein the key magnetically disengages the spring-loaded magnetic pins from the pin seats thereby moving the computing device from the locked orientation to an unlocked orientation. The method further includes lifting the top linearly away from the base; and removing the key from the computing device, thereby moving the computing device from the unlocked orientation to the locked orientation.

The method may further comprise interfacing a release handle with the computing device to separate the top from the base in the unlocked orientation.

The method may further comprise aligning the key to magnetically disengage the spring-loaded magnetic pins from the pin seats thereby moving the computing device from the locked orientation to the unlocked orientation; re-assembling the base and the top; and removing the key from the computing device, thereby moving the computing device from the unlocked orientation to the locked orientation.

The presently disclosed technology may further include a computing device comprising a base enclosure, a top enclosure, and computing hardware. The base enclosure includes a rectangular exterior perimeter and an open interior recess; a set of spring-loaded magnetic pins in a spaced arrangement about the exterior perimeter of the base enclosure, the spring-loaded magnetic pins biased to protrude outward from the base enclosure; and a set of base securing ferromagnets spaced apart within the interior recess of the base enclosure. The top enclosure includes a rectangular interior perimeter and an open interior recess, the rectangular interior perimeter to fit over the base enclosure, the rectangular interior perimeter of the top enclosure to surround the rectangular exterior perimeter of the base enclosure; a set of pin seats in a spaced arrangement about the interior perimeter of the top enclosure, each of the pin seats corresponding to one of the spring-loaded magnetic pins, the pin seats to selectively receive the spring-loaded magnetic pins in a locked orientation to prevent the top enclosure from lifting linearly away from the base enclosure; and a set of top securing ferromagnets spaced apart within the interior recess of the top enclosure, each of the top securing ferromagnets corresponding to one of the base securing ferromagnets, the top securing ferromagnets to attract the base securing ferromagnets and selectively pull the top enclosure toward the base enclosure to the locked orientation. The computing hardware is mounted within the open interior recess in one or both of the base enclosure and the top enclosure.

The computing device may further comprise a key to selectively interface with an outer perimeter of the base enclosure, the key to retract the spring-loaded magnetic pins into the base enclosure responsive at least to its placement at a predefined position with reference to the computing device.

In some implementations, the top enclosure is free to be lifted linearly away from the base enclosure with the spring-loaded magnetic pins retracted into the base enclosure using the key.

In some implementations, the key includes a set of unlock magnets in a spaced arrangement about an interior perimeter of the key, each of the unlock magnets corresponding to one of the spring-loaded magnetic pins, wherein the unlock magnets are arranged to repel the spring-loaded magnetic pins out of their respective pin seats responsive at least to the key's placement at the predefined position with reference to the computing device.

In some implementations, the base enclosure further includes a set of base securing ferromagnets spaced apart on the base enclosure; and the top enclosure further includes a set of top securing ferromagnets spaced apart on the top enclosure, each of the top securing ferromagnets corresponding to one of the base securing ferromagnets, the top securing ferromagnets to attract the base securing ferromagnets and selectively pull the top enclosure toward the base enclosure, wherein the attraction between the top securing ferromagnets and the base securing ferromagnets provides an anti-rattle feature that closes a tolerance between the base enclosure and the top enclosure.

The above specification, examples, and data provide a complete description of the structure and use of exemplary implementations of the presently disclosed technology. Since many implementations of the presently disclosed technology can be made without departing from the spirit and scope of the invention, the invention resides in the claims hereinafter appended. Furthermore, structural features of the different implementations may be combined in yet another implementation without departing from the recited claims.

What is claimed is:

1. A computing device comprising:
   a base including:
      a polygonal exterior perimeter; and
      a set of spring-loaded magnetic pins in a spaced arrangement about the exterior perimeter of the base, the spring-loaded magnetic pins biased to extend away from the base;
   a top including:
      a polygonal interior perimeter to fit over the base, the polygonal interior perimeter of the top to surround the polygonal exterior perimeter of the base; and
      a set of pin seats in a spaced arrangement about the interior perimeter of the top, each of the pin seats corresponding to one of the spring-loaded magnetic pins, the pin seats to selectively receive the spring-loaded magnetic pins to prevent the top from lifting linearly away from the base; and
   computing hardware mounted within an interior recess in one or both of the base and the top.

2. The computing device of claim 1, wherein the base is a base plate and the top is a top enclosure, and wherein the computing hardware is mounted within the interior recess in the top enclosure.

3. The computing device of claim 1, wherein the base is a base enclosure and the top is a top enclosure, and wherein the computing hardware is mounted within the interior recess in the base enclosure.

4. The computing device of claim 1, further comprising:
   a key to selectively interface with an outer perimeter of the base, the key to retract the spring-loaded magnetic pins into the base responsive at least to its placement at a predefined position with reference to the computing device.

5. The computing device of claim 4, wherein the top is free to be lifted linearly away from the base with the spring-loaded magnetic pins retracted into the base using the key.

6. The computing device of claim 4, wherein the key includes a set of unlock magnets in a spaced arrangement about an interior perimeter of the key, each of the unlock magnets corresponding to one of the spring-loaded magnetic pins, wherein the unlock magnets are arranged to repel the spring-loaded magnetic pins out of their respective pin seats responsive at least to the key's placement at the predefined position with reference to the computing device.

7. The computing device of claim 1, wherein:
   the base further includes a set of base securing ferromagnets spaced apart on the base; and
   the top further includes a set of top securing ferromagnets spaced apart on the top, each of the top securing ferromagnets corresponding to one of the base securing ferromagnets, the top securing ferromagnets to attract the base securing ferromagnets and selectively pull the top toward the base.

8. The computing device of claim 7, wherein the attraction between the top securing ferromagnets and the base securing ferromagnets provides an anti-rattle feature that closes a tolerance between the base and the top.

9. The computing device of claim 7, further comprising:
   a release handle including a set of handle releasing ferromagnets spaced apart on the handle, each of the handle releasing ferromagnets corresponding to one of the top securing ferromagnets, the handle releasing ferromagnets to repel the top securing ferromagnets and selectively eject the base from the top responsive to the spring-loaded magnetic pins being repelled out of their respective pin seats.

10. The computing device of claim 1, wherein the base and the top in combination form a cavity for enclosing components of the computing device.

11. The computing device of claim 1, wherein:
    the spaced arrangement of spring-loaded magnetic pins includes spring-loaded magnetic pins on opposing sides of the polygonal exterior perimeter of the base; and
    the spaced arrangement of pin seats includes pin seats on opposing sides of the interior perimeter of the top.

12. The computing device of claim 1, wherein:
    the spaced arrangement of spring-loaded magnetic pins includes spring-loaded magnetic pins on all sides of the polygonal exterior perimeter of the base; and
    the spaced arrangement of pin seats includes pin seats on all sides of the interior perimeter of the top.

13. A method of using a magnetic locking mechanism to detach a top from a base of a computing device, comprising:
    aligning a key with the base and the top,
       the base including:
          a polygonal exterior perimeter; and
          a set of spring-loaded magnetic pins in a spaced arrangement about the exterior perimeter of the base, the spring-loaded magnetic pins biased to extend away from the base;
       the top including:
          a polygonal interior perimeter to fit over the base, the polygonal interior perimeter of the top to surround the polygonal exterior perimeter of the base; and
          a set of pin seats in a spaced arrangement about the interior perimeter of the top, each of the pin seats corresponding to one of the spring-loaded magnetic pins, the pin seats to selectively receive the spring-loaded magnetic pins to prevent the top from lifting linearly away from the base, wherein the top is attached to the base in a locked orientation,
    wherein the key magnetically disengages the spring-loaded magnetic pins from the pin seats thereby moving the computing device from the locked orientation to an unlocked orientation;
    lifting the top linearly away from the base; and
    removing the key from the computing device, thereby moving the computing device from the unlocked orientation to the locked orientation.

14. The method of claim 13, further comprising:
    interfacing a release handle with the computing device to separate the top from the base in the unlocked orientation.

15. The method of claim 13, further comprising:
    aligning the key to magnetically disengage the spring-loaded magnetic pins from the pin seats thereby moving the computing device from the locked orientation to the unlocked orientation;
    re-assembling the base and the top; and
    removing the key from the computing device, thereby moving the computing device from the unlocked orientation to the locked orientation.

16. A computing device comprising:
    a base enclosure including:
       a rectangular exterior perimeter and an open interior recess;

a set of spring-loaded magnetic pins in a spaced arrangement about the exterior perimeter of the base enclosure, the spring-loaded magnetic pins biased to protrude outward from the base enclosure; and a set of base securing ferromagnets spaced apart within the interior recess of the base enclosure;

a top enclosure including:

a rectangular interior perimeter and an open interior recess, the rectangular interior perimeter to fit over the base enclosure, the rectangular interior perimeter of the top enclosure to surround the rectangular exterior perimeter of the base enclosure;

a set of pin seats in a spaced arrangement about the interior perimeter of the top enclosure, each of the pin seats corresponding to one of the spring-loaded magnetic pins, the pin seats to selectively receive the spring-loaded magnetic pins in a locked orientation to prevent the top enclosure from lifting linearly away from the base enclosure; and a set of top securing ferromagnets spaced apart within the interior recess of the top enclosure, each of the top securing ferromagnets corresponding to one of the base securing ferromagnets, the top securing ferromagnets to attract the base securing ferromagnets and selectively pull the top enclosure toward the base enclosure to the locked orientation; and computing hardware mounted within the open interior recess in one or both of the base enclosure and the top enclosure.

17. The computing device of claim 16, further comprising:

a key to selectively interface with an outer perimeter of the base enclosure, the key to retract the spring-loaded magnetic pins into the base enclosure responsive at least to its placement at a predefined position with reference to the computing device.

18. The computing device of claim 17, wherein the top enclosure is free to be lifted linearly away from the base enclosure with the spring-loaded magnetic pins retracted into the base enclosure using the key.

19. The computing device of claim 17, wherein the key includes a set of unlock magnets in a spaced arrangement about an interior perimeter of the key, each of the unlock magnets corresponding to one of the spring-loaded magnetic pins, wherein the unlock magnets are arranged to repel the spring-loaded magnetic pins out of their respective pin seats responsive at least to the key's placement at the predefined position with reference to the computing device.

20. The computing device of claim 16, wherein:

the base enclosure further includes a set of base securing ferromagnets spaced apart on the base enclosure; and the top enclosure further includes a set of top securing ferromagnets spaced apart on the top enclosure, each of the top securing ferromagnets corresponding to one of the base securing ferromagnets, the top securing ferromagnets to attract the base securing ferromagnets and selectively pull the top enclosure toward the base enclosure, wherein the attraction between the top securing ferromagnets and the base securing ferromagnets provides an anti-rattle feature that closes a tolerance between the base enclosure and the top enclosure.

\* \* \* \* \*